Feb. 5, 1952            B. C. GOULD            2,584,576
AUTOMOBILE HOOD, FENDER, AND LAMP CONSTRUCTION
Filed April 14, 1949            2 SHEETS—SHEET 1
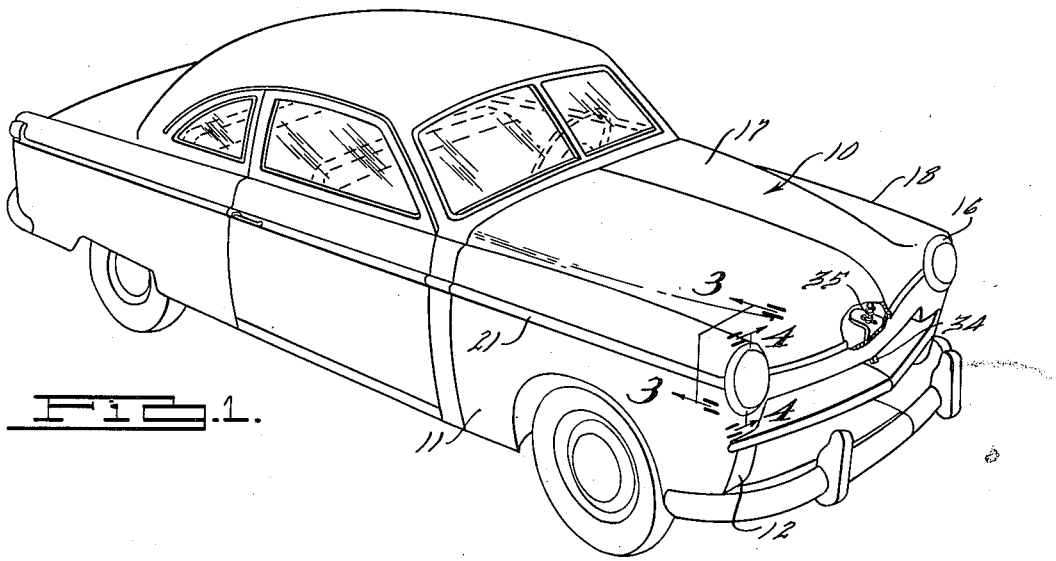
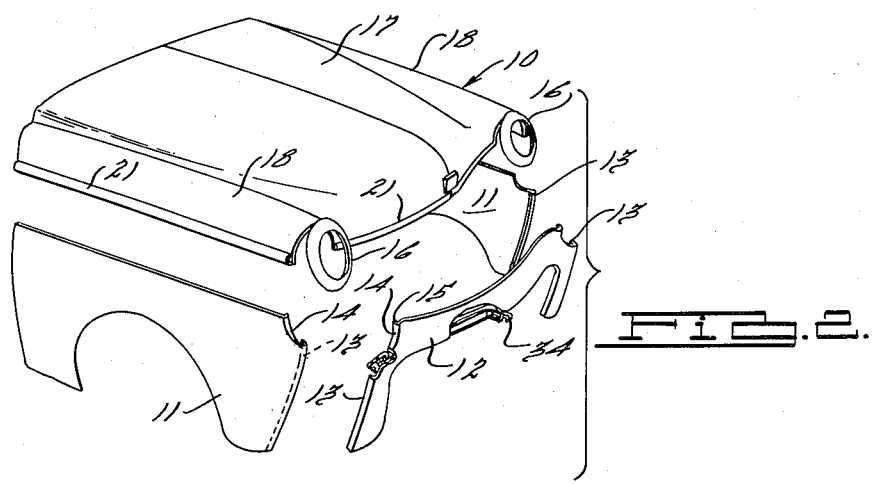
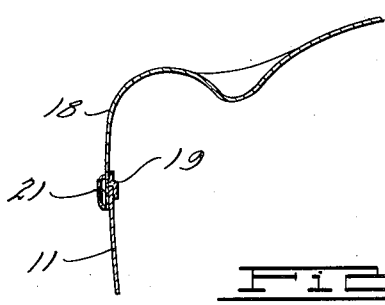
INVENTOR.
Byron C. Gould.
BY
Harness, Dickey & Pierce
ATTORNEYS.

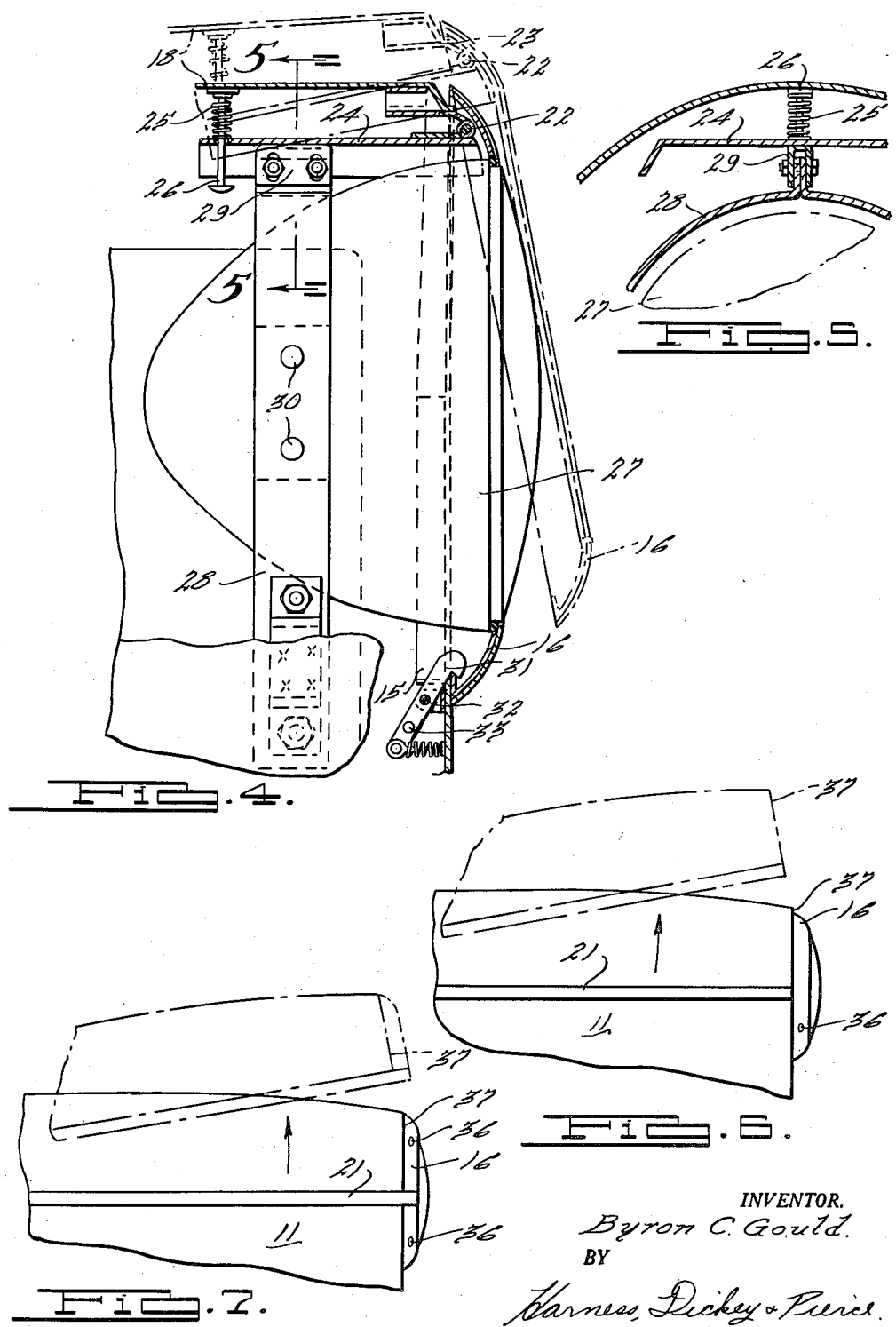

Patented Feb. 5, 1952

2,584,576

UNITED STATES PATENT OFFICE 2,584,576

AUTOMOBILE HOOD, FENDER, AND LAMP CONSTRUCTION

Byron C. Gould, Detroit, Mich., assignor to The Murray Corporation of America, Detroit, Mich., a corporation of Delaware Application April 14, 1949, Serial No. 87,531

13 Claims. (Cl. 180—69)

This invention relates to automobiles and particularly to the hood, front fender and front panel construction thereof.

The present invention pertains to the use of substantially flat panels for the fenders at each side of the automobile joined at the front to a front panel which is formed to receive the grille provided at the front of the automobile. A hood is utilized which extends forwardly from the body below the windshield to the front panel. The hood is formed outwardly at the sides into the shape of the top portions of the front fenders and cooperates with the side and front panels to complete the hood, fender and front panel construction. The edges of the fender portions of the hood are provided with a channel and a trim molding strip which cooperates with the top edge of the side fender and front panel portions to be supported thereby with the joined edges trimmed by the molding strips. This construction eliminates the difficult drawing operations practiced heretofore to provide an opening for the front head lamp in the front portion of the fender. The opening for the head lamp in each fender of the present construction is provided at the point of junction between the panels, thereby eliminating the difficult drawing operations.

The laterally disposed top fender portions on the hood mate with the trim ring disposed about the head lamps at the junction of the panels so that the hood may be raised or lowered without interfering with the rings. One half of the trim ring may be permanently attached to the forward edge of the top fender portions of the hood in position to join with the bottom halves which are permanently attached to the fender and front panel portions at the sides of the automobile. It is further contemplated that the trim rings may be pivoted to the forward edges of the top fender portions of the hood in position to swing outwardly when the hood is raised and which are automatically swung inwardly into latched position when the hood is lowered. The latching of the rings retains the hood and the top fender portions in locked position supplemented by the safety locking mechanism at the center of the hood which is similar to that now employed on present-day automobiles.

This front end construction of the automobile employs simple stampings, eliminating deep and difficult drawing operations. The two side fender panels and the front panel are shallow stampings and this is also true of the hood panel. This substantially reduces the die cost and eliminates the scrap heretofore found unavoidable when deep draws were required to produce head lamp openings in the fenders.

Accordingly, the main objects of the invention are: to provide a hood for the front end of an automobile having at the lateral edges thereof the arcuate top portions of the fenders; to form the front end of an automobile from two side fender panels, a front panel and a hood panel, the latter panel being extended at the outer edges to form the arcuate top portions of the fenders; to provide openings for a head lamp at the sides of an automobile at the point of junction between the side fender panels, the front panel and the top fender portions formed at the sides of the hood panel; to mount a head lamp permanently on the body in an opening at each side of the body at the junction between the side and front panels and the arcuate top fender portions at the side of the hood; to mount the head lamp trim ring in pivoted relation to the arcuate top fender portions at each side of the hood which swings inwardly into latched position when the hood is closed, supplemented by latching mechanism at the center of the body which is utilized for preventing the hood from unlatching if the ring latches fail; and, in general, to provide a front end panel construction for an automobile made of flat stampings which is simple in construction and which eliminates costly dies and deep drawing operations.

Other objects and features of novelty of the invention will be specifically pointed out or will become apparent when referring, for a better understanding of the invention, to the following description taken in conjunction with the accompanying drawings, wherein:

Figure 1 is a perspective view of an automobile having a front end construction embodying features of the present invention;

Fig. 2 is an exploded view of the front panels employed on the automobile illustrated in Fig. 1, forwardly of the body thereof;

Fig. 3 is an enlarged sectional view of the structure illustrated in Fig. 1, taken on the line 3—3 thereof;

Fig. 4 is an enlarged sectional view of the structure illustrated in Fig. 1, taken on the line 4—4 thereof;

Fig. 5 is a sectional view of the structure illustrated in Fig. 4, taken on the line 5—5 thereof;

Fig. 6 is a view of structure, similar to that illustrated in Fig. 1, showing a modified form thereof; and Fig. 7 is a view of structure, similar to that illustrated in Fig. 6, showing a further form which the invention may assume.

Referring to Figs. 1–5, the front end construction of the automobile comprises a combined hood and top fender panel 10 which cooperates with right and left fender panels 11 and a front panel 12. The side panels 11 and front panels 12 are provided with inturned flanges 13 which are joined together by crimping, welding or like operations when attached to the body and chassis frame. Above the flanges 13 arcuate cutout portions 14 are provided which, when the panels are joined together, form the lower half of annular openings for receiving the automobile head lamps. The edges of the cutout portions 14 are preferably flanged inwardly at 15 to provide strength thereto, each opening being trimmed by a ring 16 which encompasses the head lamps. The top panel 10 has a central hood portion 17 and top fender portions 18 at each side thereof. The fender portions of the hood are arched downwardly to form the top portion of the fenders in continuation of the belt line of the body. It will be noted that in this construction the side panels 11 are simple stampings, the same as the front panel and form the side and front panel portions forwardly of the A pillars and the cowl of the body. A Z-shaped channel strip 19 may be provided at the side edges of the hood and fender panel 10 for receiving the upper edge of the side fender panels 11 to rest thereon and be aligned therewith. Trim molding strips 21 may be attached along the side and front edges of the panel 10 for trimming the joint with the fender and front panels 11 and 12. The trim molding strips 21 may be eliminated as the hood panel 10 will directly overlap the fender panels 11 and the joint will not be too apparent when the same color paint is used and will form a break line if two colors are employed.

From an examination of the panels as illustrated in Fig. 2, it will be noted that all of the panels are of very shallow construction so that no deep drawing operations are required on the metal employed therefor. As a result, the material and die costs are substantially reduced and the loss due to the scrapping of panels because of defects resulting from deep drawing operations is eliminated.

Referring to Figs. 4 and 5, it will be noted that in this construction the trim rings 16 are pivoted to the panel portions 18 of the hood stamping 10 by pivot pins 22. The pins 22 are supported by brackets 23 secured in fixed position to the outer edge of the top fender portions 18 in position to pivotally support channel arms 24 fixed to the inner surface of the rings 16. The inner end of each of the channel arms 24 carries a spring 25 retained thereon by a headed pin 26 in position to force the arms 24 downwardly from the fender portions 18 when the hood is raised to cause the rings 16 to swing outwardly to thereby clear the front portion of the head lamps 27. The head lamps 27 are fixed to the chassis frame by suitable brackets 28 which have an adjustable upper end 29 which cams the arms 24 upwardly to cause the rings 16 to move to closed position when the hood is lowered. By adjusting the ends 29 relative to the arms 24, the rings will move into engagement with latch arms 31 provided on the front panel 12. The latch arms 31 on each side of the body are pivoted at 32 and are interconnected by a rod 33 having a handle portion 34 at the center, as illustrated in Fig. 1. When the latch arms 31 are rocked counterclockwise, the head light trim rings 16 are released to permit the hood to be raised sufficiently to have the safety latch 35, illustrated in Fig. 1, available to be unlatched so that the hood panel 10 may be raised.

This construction provides positive latching for the hood panel at each side thereof, as well as a safety central latch for retaining the hood panel 10 in fixed relation to the fender and front panels 11 and 12. It will be understood that the hood panel 10 is attached to the body in the conventional manner by suitable hinges well known in the art which are not herein illustrated. In this construction, the hood may be opened without releasing the latch from the interior of the body as is the common practice in present-day automobiles.

In Fig. 6 a further form of the invention is illustrated, that wherein the trim rings 16 are secured in fixed relation at the lower half of the openings in the panels 11 and 12 by suitable means herein illustrated as by screws 36. The top half of the rings project upwardly in position to be engaged by the forward edge 37 of the lateral fender portions 18 of the hood panel 10. A rearwardly projecting flange may be provided on the rings over which the formed edges of the fender portions 18 of the hood panel 10 overlap.

In Fig. 7 the rings 16 are illustrated as being split in half following the line at the top of the fender panels 11 and front panel 12, the lower portions being secured to the panels by the screws 36. The upper half of the rings 16 is secured to the forward edge 37 of the fender panel portions 18 of the hood panel 10 by similar screws 36. The trim strips 21 are extended over the lower edges of the upper half of the ring portions to cover the joint between the two ring sections at each side of the body.

In any of the constructions herein illustrated and described, a front panel arrangement is provided for an automobile which is constructed of simple stampings which eliminate the deep drawing operations in the fenders while locating the headlights in the same position in the forward fender portion of the body. When the trim rings for the headlights are pivoted to the top fender portion of the hood, latches are provided for the hood panel at the lateral extremities of the hood panel. When the rings are fixed to the panels, as illustrated in Figs. 6 and 7, the same latching mechanism is employed therewith that is utilized on the present-day automobile for retaining the hood in locked position actuated from a handle or knob on the interior of the body. In either latching arrangement, a central safety latch is provided at the forward edge of the hood panel to prevent the hood panel from inadvertently being raised in case the first latching mechanism is insecurely engaged.

What is claimed is:

1. A front end construction for a vehicle body comprising side fender panels, a front panel and a one-piece hood panel having laterally disposed upwardly arched top fender portions, said front and side panels having arcuate edge portions jointly cooperating with the forward edges of said upwardly arched fender portions to define two spaced openings for head lamps, said front panel extending to and engaging said hood panel and said side panels.

2. In a front end automobile construction having head lamps, the combination including substantially vertically disposed side fender and front panels which are secured together at the front edge and are mounted in fixed relation to an automobile frame and body, arcuate cutout portions provided at the top junction of the panels for the reception of the lower part of the head lamps, a hood panel pivotally mounted on the automobile having a central hood portion and laterally disposed upwardly then downwardly curved top fender portions which mate with said side fender and front panels and complete the head lamp openings, the upper portion of the head lamps being encompassed thereby.

3. In a front end automobile construction having head lamps, the combination including substantially vertically disposed side fender and front panels which are secured together at the front edge and are mounted in fixed relation to an automobile frame and body, arcuate cutout portions provided at the top meeting edges of the panels for the reception of the lower part of the head lamps, a hood panel pivotally mounted on the automobile having a central hood portion and laterally extending downwardly curved top fender portions which mate with said side fender and front panels and complete the head lamp openings, and trim rings for the head lamps secured to the side fender and front panels.

4. In a front end automobile construction having head lamps, the combination including substantially vertically disposed side fender and front panels which are secured together at the front edge and are mounted in fixed relation to an automobile frame and body, arcuate cutout portions provided at the top meeting edges of the panels for the reception of the lower part of the head lamps, a hood panel pivotally mounted on the automobile having a central hood portion and laterally extending downwardly curved top fender portions which mate with said side fender and front panels and complete the head lamp openings, and head lamp trim rings for the opening split in half and secured respectively to the fender portions of the hood panel and to the side and fender and front panels so that the upper half of the trim rings is raised with the hood.

5. In a front end automobile construction having head lamps, the combination including substantially vertically disposed side fender and front panels which are secured together at the front edge and are mounted in fixed relation to an automobile frame and body, arcuate cutout portions provided at the top meeting edges of the panels for the reception of the lower part of the head lamps, a hood panel pivotally mounted on the automobile having a central hood portion and laterally extending downwardly curved top fender portions which mate with said side fender and front panels and complete the head lamp openings, trim rings pivoted to the fender portions of the hood panels to be carried thereby, and means for moving the rings into engagement with the side fender and front panels when in lowered position.

6. In a front end automobile construction having head lamps, the combination including substantially vertically disposed side fender and front panels which are secured together at the front edge and are mounted in fixed relation to an automobile frame and body, arcuate cutout portions provided at the top meeting edges of the panels for the reception of the lower part of the head lamps, a hood panel pivotally mounted to the automobile having a central hood portion and laterally extending downwardly curved top fender portions which mate with said side fender and front panels and complete the head lamp openings, trim rings pivoted to the fender portions of the hood panels to be carried thereby, means for moving the rings into engagement with the side fender and front panels when in lowered position, and latch means actuated by the movement of the trim rings for retaining the trim rings and the hood panel in latched position.

7. In an automobile construction, a pair of substantially flat fender panels to be disposed substantially vertical when mounted on an automobile, a front panel having edges matable with said fender panels when disposed therebetween, and a hood panel matable with said fender and front panels, said panels having arcuate portions, the junction of which at the mating corners providing apertures for the reception of a head lamp.

8. In an automobile construction, a pair of substantially flat fender panels to be disposed substantially vertical when mounted on an automobile, a front panel having edges matable with said fender panels when disposed therebetween, a hood panel matable with said fender and front panel, said panels having an arcuate portion, the junction at the corner of which form apertures for the reception of head lamps, and trim rings provided for each of the apertures for trimming the edges of the three panels at the opening at the junction thereof.

9. In an automobile construction, a hood panel, fender panels and a front panel engageable with each other to complete the front end panel construction of the automobile, the junction between the forward edges of the fender panels, the lateral edges of the front panel and the lateral edges of the hood panel forming apertures for the reception of head lamps, a portion of said apertures being disposed in each of said panels.

10. In an automobile construction, a hood panel, fender panels and a front panel engageable with each other to complete the front end panel construction of the automobile, the junction between the forward edges of the fender panels, the lateral edges of the front panel and the lateral edges of the hood panel forming apertures for the reception of head lamps, a portion of said apertures being disposed in each of said panels, and trim rings for dressing the edges of the apertures.

11. In an automobile construction, a hood panel, fender panels and a front panel engageable with each other to complete the front end panel construction of the automobile, the junction between the forward edges of the fender panels, the lateral edges of the front panel and the lateral edges of the hood panel forming apertures for the reception of head lamps, a portion of said apertures being disposed in each of said panels, trim rings for dressing the edges of the apertures, and means for pivoting said trim rings to said hood panel to permit them to move outwardly for clearing the head lamps when the hood panel is raised.

12. In an automobile construction, a hood panel, fender panels and a front panel engageable with each other to complete the front end panel construction of the automobile, the junction between the forward edges of the fender panels, the lateral edges of the front panel and the lateral edges of the hood panel forming apertures for the reception of head lamps, a portion of said apertures being disposed in each of said panels, trim rings for dressing the edges of the apertures, means for pivoting said trim rings to said hood panel to permit them to move outwardly for clearing the head lamps when the hood panel is raised, and means for moving said trim rings into engagement with the panels when the hood panel is moved to closed position.

13. In an automobile construction, a hood panel, fender panels and a front panel engageable with each other to complete the front end panel construction of the automobile, the junction between the forward edges of the fender panels, the lateral edges of the front panel and the lateral edges of the hood panel forming apertures for the reception of head lamps, a portion of said apertures being disposed in each of said panels, trim rings for dressing the edges of the apertures, means for pivoting said trim rings to said hood panel to permit them to move outwardly or clearing the head lamps when the hood panel is raised, means for moving said trim rings into engagement with the panels when the hood panel is moved to closed position, and latch means operated by said trim rings near the end of the closing movement for latching the hood panel in closed position.

BYRON C. GOULD.

REFERENCES CITED

The following references are of record in the file of this patent:

UNITED STATES PATENTS

| Number | Name | Date |
|---|---|---|
| 2,051,263 | MacPherson et al. | Aug. 18, 1936 |
| 2,059,626 | Edwards | Nov. 3, 1936 |

OTHER REFERENCES

"Changes in '49 Buicks," from "Automotive Industries" of Dec. 1, 1948, page 27.

"L'Auto Carrosserie," Supplement No. 128 of Mar.-Apr., 1927, Pl. 799.